Sept. 13, 1932.    H. W. SCHULTZ    1,877,064
SCALE STRUCTURE
Filed April 23, 1930    2 Sheets-Sheet 2
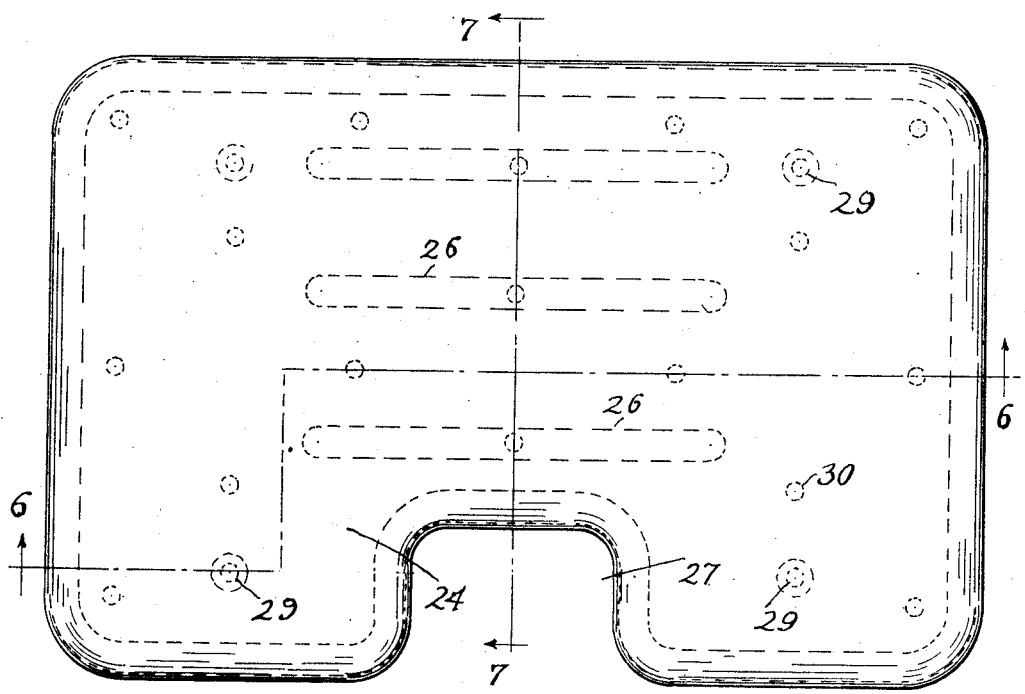
Fig. 5.
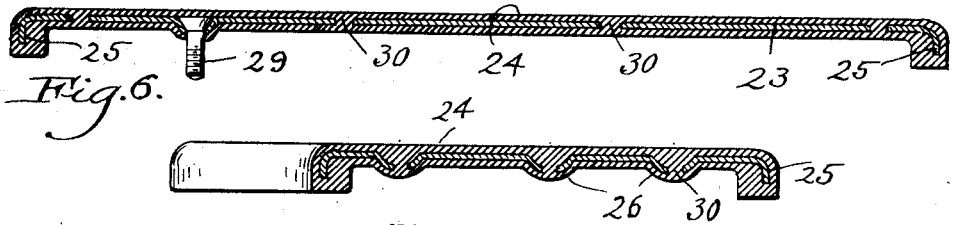
Fig. 6.
Fig. 7.
Inventor:
Howard W. Schultz
Kwis Hudson & Kent
attys.

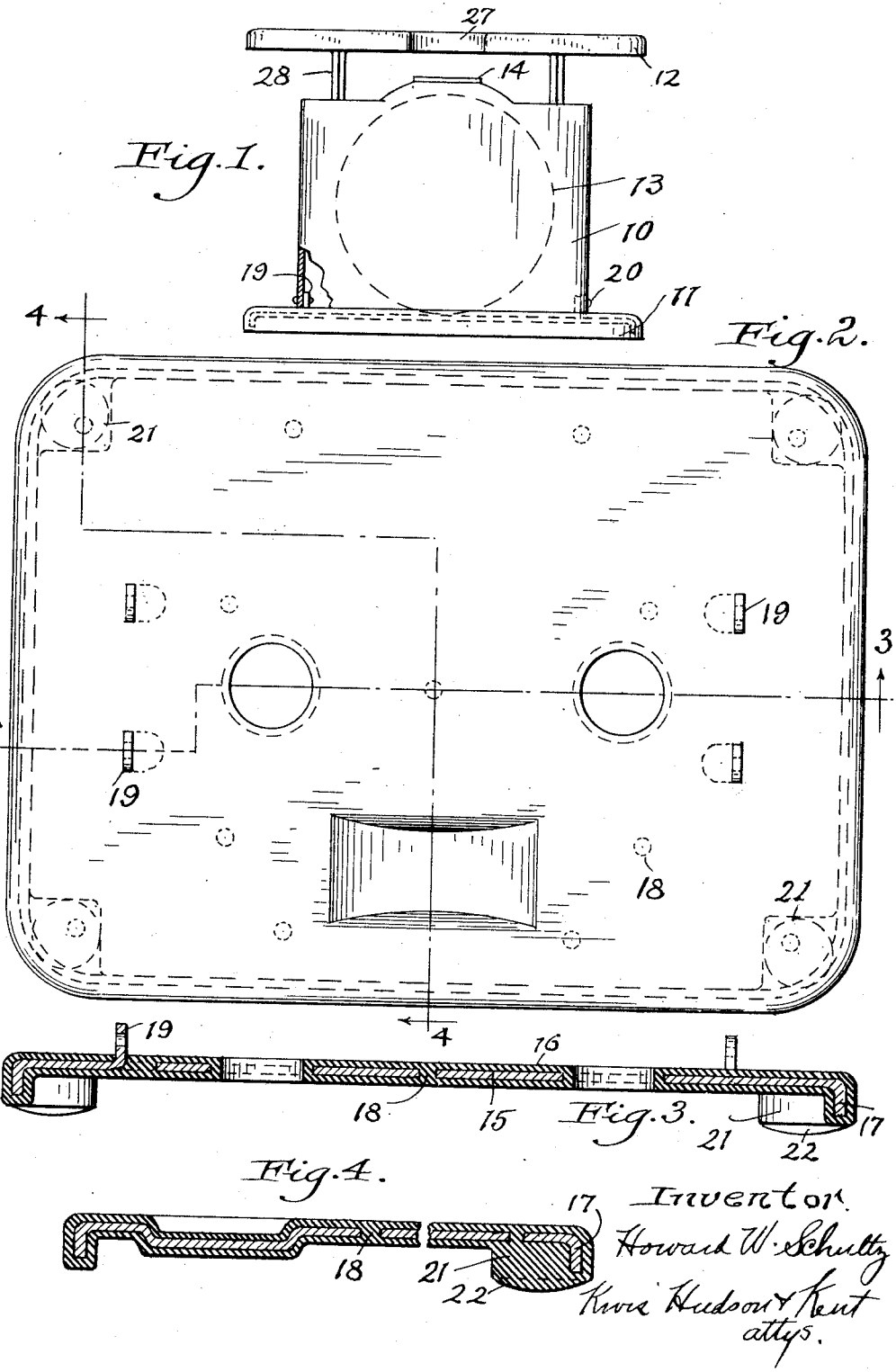

Patented Sept. 13, 1932

1,877,064

UNITED STATES PATENT OFFICE

HOWARD W. SCHULTZ, OF LAKEWOOD, OHIO, ASSIGNOR TO THE OHIO RUBBER COMPANY, OF CLEVELAND, OHIO, A CORPORATION OF OHIO

SCALE STRUCTURE

Application filed April 23, 1930. Serial No. 446,519.

This invention relates to scales of the type now commonly used for weighing persons, and generally known as "bathroom" scales.

As its principal object, this invention aims to provide an improved form of construction for scales of this type in which a composite steel and rubber platform and supporting base are employed; and in which the rubber covering of the base is provided with integral thickened portions forming supporting feet or pads.

Other objects and advantages of this invention will be apparent from the following description, taken in conjunction with the accompanying sheets of drawings, in which:

Fig. 1 is an elevational view showing a scale structure embodying my invention;

Fig. 2 is a top plan view showing a scale base constructed according to my invention;

Fig. 3 is a sectional view taken on line 3—3 of Fig. 2;

Fig. 4 is a sectional view taken on line 4—4 of Fig. 2;

Fig. 5 is a top plan view showing a scale platform constructed according to my invention;

Fig. 6 is a sectional view taken on line 6—6 of Fig. 5; and

Fig. 7 is a sectional view taken on line 7—7 of Fig. 5.

In the drawings illustrating my invention, I have shown a scale structure adapted to be stood upon by a person whose weight is to be ascertained. This structure comprises a casing 10 in which is housed the scale mechanism, a base 11 for supporting the casing and mechanism, and a platform 12 movable relative to the base and operably connected to the mechanism within the casing. The casing may be constructed of sheet metal stampings suitably shaped to enclose the scale mechanism in such a manner that the rotatable dial 13 may be observed, through the window 14 provided at the top of the casing, by a person standing upon the platform 12.

The base 11 comprises a substantially rectangular metal plate 15 to the opposite sides of which a rubber covering 16 has been vulcanized. This metal plate is preferably formed as a stamping having a depending marginal flange 17 around its outer edges. The rubber covering is secured to opposite sides of the plate by being vulcanized in contact with the metal, and extends around the edges of the plate so as to completely cover the flange 17. The rubber covering also extends into openings provided through the metal plate so as to cover and protect the edges of the metal around these openings. To assist in securing the coverings to the metal a plurality of openings may be provided at spaced points, so that the covering on opposite sides of the plate may be secured together by integral rubber stems 18 extending through these openings.

The scale mechanism housed within the casing 10 is supported upon the base 11 and connected thereto in any suitable manner. The casing is also supported by the base and is attached to the integral upwardly extending lugs 19, by means of the screws 20.

At the corners of the base, the rubber covering is provided with thickened portions which form the feet or supporting pads 21. These pads may be of any suitable size and shape to provide the bearing surface required and, as herein illustrated, may be formed with a rounded bottom portion 22.

In Fig. 5 of the drawings, I have shown the scale platform as comprising a metal body 23 having rubber covering 24 vulcanized to opposite sides thereof. This metal body is preferably constructed in the form of a sheet metal stamping of substantially rectangular form having a depending marginal flange 25. In addition to the reinforcement derived from the marginal flange 25, the metal body may also be provided with suitable stiffening ribs or channels 26 opposite the recess 27 through which the dial 13 is observed. For securing the platform to the posts 28 extending upwardly from the scale mechanism, I provide screws 29 having the heads thereof received in countersunk openings provided in the metal body. The screw heads may be permanently secured in these countersunk openings by being welded to the metal body.

The rubber covering is secured to the surface of the body by being vulcanized in contact with the metal and extends around the depending flange 25 so as to completely cover the edges of the platform. The rubber covering also extends over and conceals the heads of the screws 29. To assist in securing the covering to the surface of the metal body, openings may be provided at spaced points so that the covering on opposite sides thereof may be connected together by integral rubber stems 30 extending through these openings. The top surface of the rubber covering may be given any desirable pattern or configuration during the vulcanizing operation.

It will now be readily seen that I have provided a form of scale construction in which the platform and supporting base are provided with a yielding and waterproof covering which is also durable and attractive. This covering also protects the metal against corrosion and makes the use of paint or enamel on these members unnecessary. The supporting pads provided on the base prevent the metal from coming into direct and damaging contact with floor surfaces upon which the scale is placed.

While I have illustrated and described my invention in a detailed manner, it should be understood, however, that I do not intend to limit myself to the precise details of construction shown and described, but regard my invention as including such changes and modifications as do not involve a departure from the spirit of the invention and the scope of the appended claims.

Having thus described my invention, what I claim is:

1. A composite base comprising a metal plate having a depending marginal flange, and rubber covering vulcanized to opposite sides of said plate and extending around said flange, said covering having thickened portions providing supporting pads for the base.

2. A composite scale base comprising a substantially rectangular metallic plate having depending marginal flanges, and rubber covering vulcanized to opposite sides of said plate and extending around the edges of said flanges, said covering having integral thickened portions providing supporting pads at the corners of said base.

In testimony whereof, I hereunto affix my signature.

HOWARD W. SCHULTZ.